United States Patent [19]
Lilja et al.

[11] Patent Number: 5,991,640
[45] Date of Patent: Nov. 23, 1999

[54] DOCKING AND ELECTRICAL INTERFACE FOR PERSONAL USE COMMUNICATION DEVICES

[75] Inventors: Patrik H. Lilja, Raleigh; Troy Bourgeois, Apex; Gregory S. Patterson, Morrisville, all of N.C.

[73] Assignee: Ericsson Inc., Research Triangle Park, N.C.

[21] Appl. No.: 08/766,368

[22] Filed: Nov. 22, 1996

[51] Int. Cl.⁶ .............................. H04B 1/06; H04B 7/26; H04Q 7/32

[52] U.S. Cl. .................... 455/557; 455/569; 455/573; 455/575; 455/346

[58] Field of Search .................... 455/557, 569, 455/573, 575, 90, 99, 345, 346

[56] References Cited

U.S. PATENT DOCUMENTS

| | | | |
|---|---|---|---|
| 4,845,738 | 7/1989 | Takano | 455/569 |
| 5,333,176 | 7/1994 | Burke et al. | 455/557 |
| 5,754,962 | 5/1998 | Griffin | 455/569 |
| 5,797,088 | 8/1998 | Stamegna | 455/345 |
| 5,809,432 | 9/1998 | Yamashita | 455/557 |
| 5,867,794 | 2/1999 | Hayes et al. | 455/557 |

FOREIGN PATENT DOCUMENTS

| | | |
|---|---|---|
| 0 494 780 A2 | 7/1992 | European Pat. Off. . |
| 2 264 613 | 9/1993 | United Kingdom . |
| WO 94/24775 | 10/1994 | WIPO . |

OTHER PUBLICATIONS

Stimier, William E., *Quick Specification for an Integrated Cellular Telephone Electronics Module*, Delco Electronics Corporation, Feb 7, 1996.

*Primary Examiner*—Willis R. Wolfe
*Attorney, Agent, or Firm*—Jenkens & Gilchrist, P.C.

[57] ABSTRACT

A docking and electrical interface for physically supporting and electrically interconnecting a personal communication device, such as a mobile cellular telephone, and a master electronic system, such as the electronic system of an automobile. Utilizing the interface allows an operator to selectively control the personal communication device using the master controls for the master electronic system, removing the need to access and manipulate the controls of the personal communication device.

27 Claims, 3 Drawing Sheets

DOCKING AND ELECTRICAL INTERFACE FOR PERSONAL USE COMMUNICATION DEVICES

BACKGROUND OF THE INVENTION

1. Technical Field of the Invention

The present invention relates to electrical interfaces, and in particular, to a docking and electrical interface between a portable mobile cellular telephone and a master electronics system.

2. Description of Related Art

The size of personal use radio frequency (RF) transceivers, such as cellular telephones, continues to decrease. As such decreases occur, the size of certain human interface components (e.g., digital readouts and keypads) reaches a point where operation of such components becomes difficult, thus requiring increasing care and attention by an operator to read information displayed on the display and/or to accurately manipulate the keys and controls of the telephone. Such decreases in size accordingly approach a lower limit defined by the size of those certain components in relation to size limitations imposed by an operator's fingers and eyes.

Compounding the problem associated with operation of a cellular telephone or the like including smaller human interface components is that such devices are increasingly used in situations where it is undesirable and difficult to devote the increased attention required to operate the device. One prime example of such a situation is the use of a mobile cellular telephone during the operation of an automobile. Diverting attention away from the operation of the automobile to operate the telephone is undesirable. Having to divert additional attention away from the operation of an automobile due to the inclusion of smaller interactive human interface components, such as displays and keypads, only compounds the problem. Thus, there is an increasing tension between the continued reduction of size of personal use transceivers, such as mobile cellular telephones, and the operation of such devices in certain situations.

Previous attempts have been made to remedy the tension described above. For example, larger, separate keypads and display units for telephones have been developed to address the problem. These components are typically mounted in the general area intended for the telephone's use (e.g., inside an automobile). While simultaneously allowing the telephone to be reduced in size and providing appropriately sized interactive components, this type of prior art device suffers from several disadvantages.

First, it has been found that the separate display components are difficult to read and awkward to operate in an automobile. Additionally, the use of such separate components requires that the user divert his or her attention from operation of the automobile to properly operate the telephone. Finally, the addition of separate components and equipment to the standard equipment of an automobile is typically not desired for various aesthetic reasons. Such human interface components are included in addition to the human interface components of the master electronics system of the automobile. There would be an advantage if personal use RF transceivers, such as mobile cellular telephones, could operate and be controlled through a master electronic system, such as the standard equipment electronics found in an automobile.

SUMMARY OF THE INVENTION

The present invention comprises a docking and electrical interface provided between a personal use RF transceiver, such as a portable mobile cellular telephone, and a master electronic system of, for example, an automobile.

The docking and electrical interface of the present invention includes a phone unit, a control unit, a power unit, an audio unit, a master data unit, an antenna and an accessory unit. Using the docking and interface of the present invention, a portable mobile cellular telephone is removably placed within a docking station of the phone unit. The phone unit of the docking and electrical interface simultaneously supports the portable mobile cellular telephone, provides battery charging via the power unit for the portable mobile cellular telephone, and interfaces the master electronic system via the audio unit and the master data unit, with the portable mobile cellular telephone so that portable mobile cellular telephone can receive and transmit information using the existing human interface controls and displays found within the automobile. The master electronic system comprises a master control, a master audio device(s) and a master power source. The controls of the various components of the master electronic system not only provide control of the basic functions of the portable mobile cellular telephone via the master data unit, such as placing and receiving cellular telephone calls and storing and retrieving often utilize telephone numbers, but also provide control for expanded functions of the portable cellular mobile telephone via the accessory unit, including without limitation, short message services (SMS), facsimile, voice mail and answer services.

The antenna of the docking and electrical interface of the present invention provides the docked portable cellular mobile telephone with increased transmitting and reception capabilities. The control unit provides overall control over and coordination of the various units of the docking and electrical interface.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
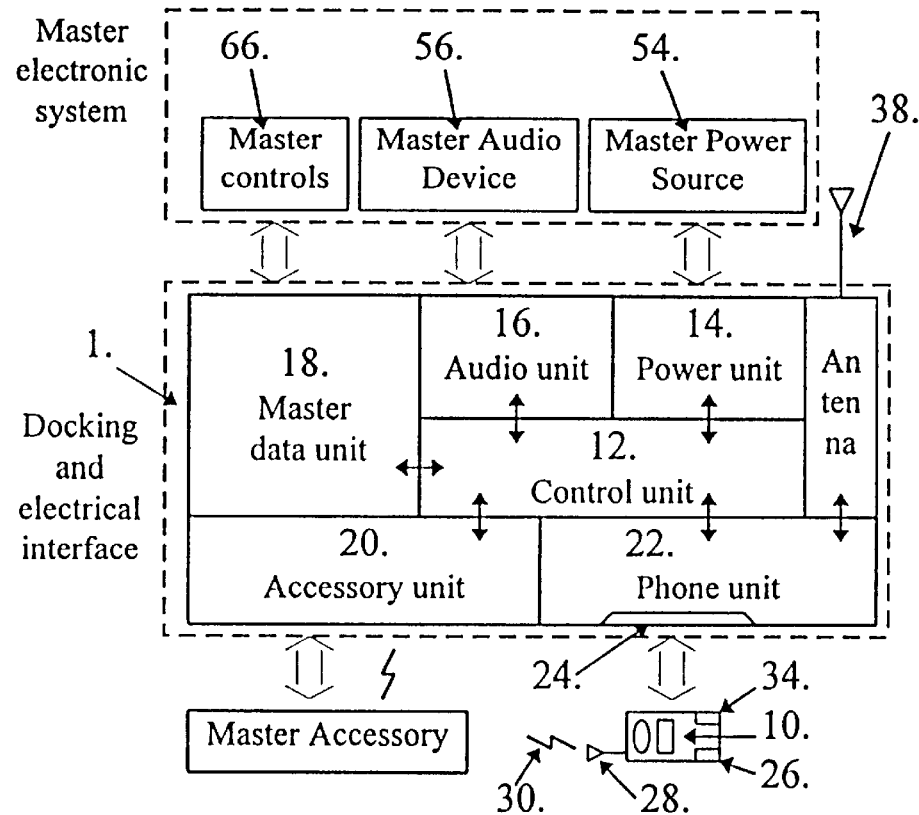
FIG. 1 is a functional block diagram of an embodiment of the docking and electrical interface of the present invention.

FIG. 1 is a block diagram of a docking and electrical interface 1 and a personal communication device 10. The docking and electrical interface 1 comprises two primary components, a control unit 12 and a phone unit 22, and four other optional components: (1) a power unit 14; (2) an audio unit 16; (3) a master data unit 18; and (4) an accessory unit 20. As will be described in detail below, each of the above-identified units is connected to one or more of the other units and/or the personal communication device 10.

The phone unit 22 of the docking and electrical interface 1 provides a physical support for the personal communication device 10 and an electrical interface between the phone unit 22 and the personal communication device 10. The phone unit 22 includes a cradle 24 which is configured to releasibly receive and secure the personal communication device 10 within the docking and electrical interface 1.

Figure 5:
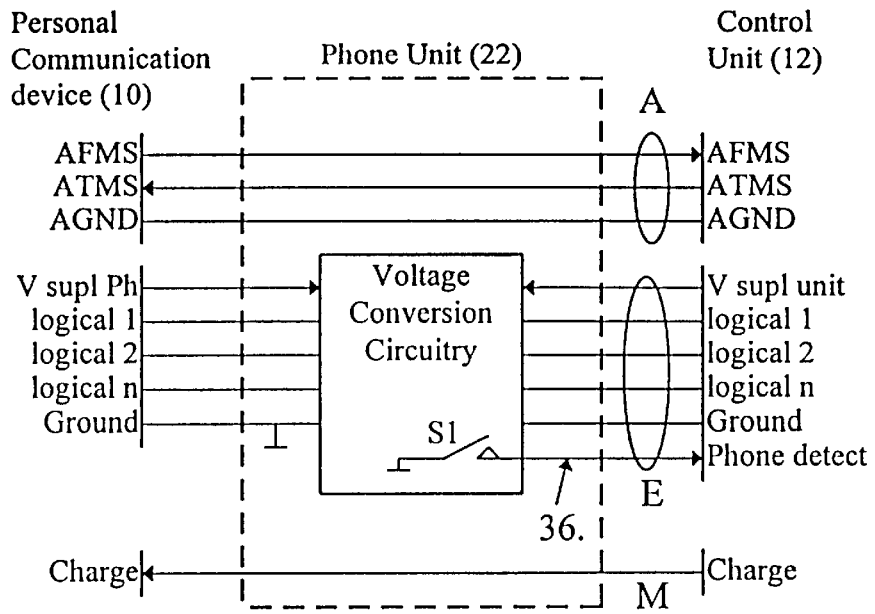
FIG. 5 is a block diagram of a phone unit of the docking and electrical interface of the present invention.

As illustrated in FIG. 5, the phone unit 22 provides an electrical interface between the control unit 12 and the personal communication device 10. This electrical interface allows the control unit 12 to used with a variety of personal communication devices utilizing different supply voltages.

Figure 2:
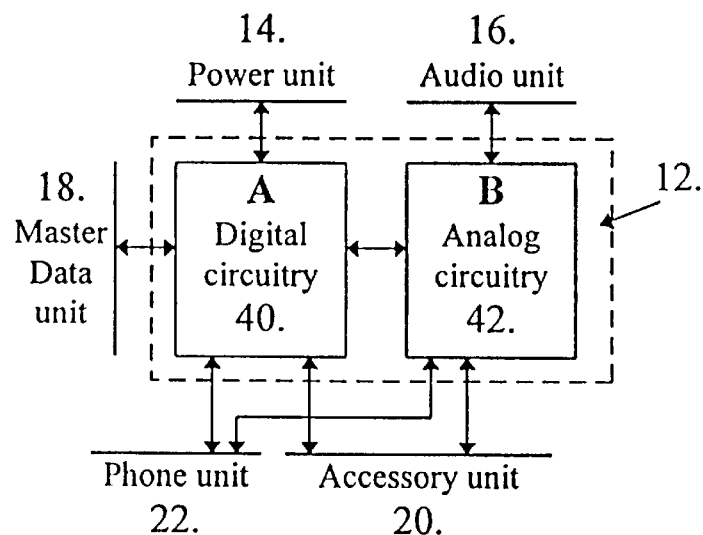
FIG. 2 is a block diagram of the control unit of the docking and electrical interface of the present invention.
Figure 3:
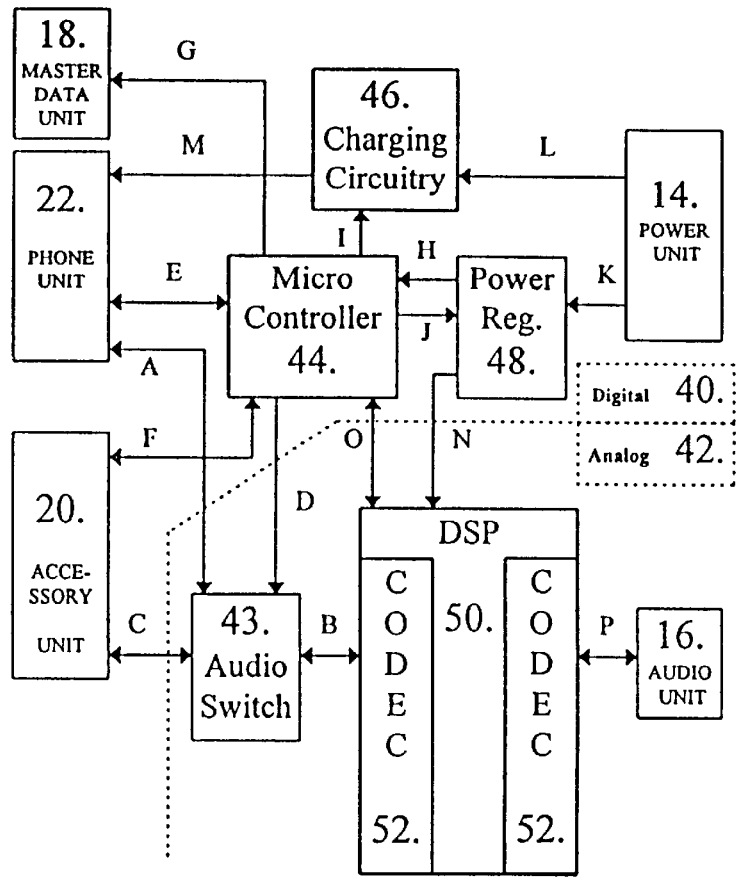
FIG. 3 is a more detailed block diagram of the control unit of the docking and electrical interface of the present invention.

The personal communication device 10, such as a portable cellular telephone, includes a battery 26, an antenna 28 for receiving radio frequency communications 30 and a connector 34. Now referring again to FIG. 5, the interface of the phone unit 22 detects presence of a personal communication device 10 within the cradle 24 by sensing the "phone detect" line 36. When properly docked, the personal communication device 10 closes switch S1. The phone unit 22 also provides electrostatic discharge ("ESD") protection to all pins and voltages conversion circuits for digital signals, making the phone unit 22 adaptable to personal communication devices 10 having a wide range of power supply voltages. The docking and electrical interface 1 also includes an antenna 38 to provide a remote antenna for the personal communication device 10 when it is docked in the docking and electrical interface 1. As illustrated in FIG. 2, the control unit 12 of the docking and electrical interface 1 is connected to all other primary components of the docking and electrical interface 1 and is further subdivided into a digital circuitry section 40 and an analog circuitry section 42. As illustrated in FIG. 3, the digital circuitry section 40 includes a micro-controller 44 capable of simultaneously transmitting data between the digital circuitry section 40 and the phone unit 22 and between the digital circuitry section 40 and the accessory unit 20. The micro-controller 44 controls the operation of the docking and electrical interface 1 to interface and interact the personal communication device 10 and the master electronic system. Now referring to the letter references provided in FIG. 3, letter A denotes the audio interface lines between the phone unit 22 and the accessory unit 20. Letter B denotes the audio interface lines between the accessory unit 20 and the audio switch 43. Letter C denotes the interface line between the DSP circuit 50 and the audio switch 43. These lines are illustrated in further detail in FIG. 4. Line D identifies the signal between the audio switch 43 and the micro-controller 44. The signal on this line determines whether audio to and from the phone unit 22 should be routed to the accessory unit 20 or the audio unit 16.

Logical signals between the micro-controller 44 and various other components of the system pass through lines E, F & G. Power supply voltage for the micro-controller 44 is provided via line H. Control output for the charging circuitry 46 is provided via line I. When active, the charging circuit 46 is set to a low power mode. Line J is the control output line for the power regulator 48. When active, it powers down the audio circuitry. Line K is the power supply line from the power unit 14 to the power regulator 48. In a preferred embodiment, it provides 12 volts to the power regulator 48. Line L provides power supply from the power unit 14 to the charging circuitry 46 (e.g., filtered 12 volt).

Charging output from the charging circuitry 46 to the phone unit 22 is carried via line M. The personal communication device 10 is charged via line M. Line N provides power supply to the DSP circuit 50 and can be turned off by the micro-controller 44 (via Line J described above). Line O denotes a control channel between the micro-controller 44 and the DSP circuit 50. This channel is a serial interface and, in a preferred embodiment, comprises 6 signals: data to/from the components; frame synchronization to/from the components; DSP send request interrupt; and a clock signal. Although six signals are described, depending upon the desired DSP circuitry, any suitable number of signals can be used. Finally, line P represents the audio line from the DSP circuit 50 to the audio unit 16. This interface is further detailed in FIG. 6.

A preferred embodiment of the micro-controller 44 of the docking and electrical interface 1 comprises two universal asynchronous receiver/transmitters ("UART") capable of simultaneous data transmission at 115.2 kbits/s (illustrated at lines E & F of FIG. 3) and two serial input/outputs ("SIO") (software or hardware) capable of data transmission at 9.6 kbits/s (illustrated at lines G & O in FIG. 3), 16 kB of read only memory (ROM) and 1 kB of random access memory (RAM).

Charging circuitry 46 within the digital circuitry section 40 connects the power unit 14 and the phone unit 22 and provides a constant current source from the power unit 14 to the personal communication device 10 when docked. If needed, the charging circuitry 46 can transform power received from the power unit 14 before it is provided to the phone unit 22. A power regulator 48 is located between the power unit 14 and the micro-controller 44 and distributes power to all the other units of the docking and electrical interface 1 and the personal communication device 10. Controlled by micro-controller 44, the power regulator 48 will power down units and circuits not in use by the docking and electrical interface 1.

The analog circuitry section 42 connects the phone unit 22, the accessory unit 20 and the audio unit 16, providing, via a digital signal processor ("DSP") 50 and its analog to digital converters (e.g., Codecs) 52, noise cancellation, voice recognition, loudspeaker echo cancellation and network echo cancellation for the docking and electrical interface 1. The analog circuitry section 42 is controlled by the micro-controller 44 via a serial channel, allowing the DSP internal settings (e.g., echo cancelling On/Off) to be changed. Although the DSP 50 and Codecs 52 are described herein as being within the analog circuitry section 42, it is noted that the DSP 50 and Codecs 52 can be replaced by standard audio amplifiers and a built-in speech switching algorithm or reside in the personal communication device 10, if desired.

Figure 4:
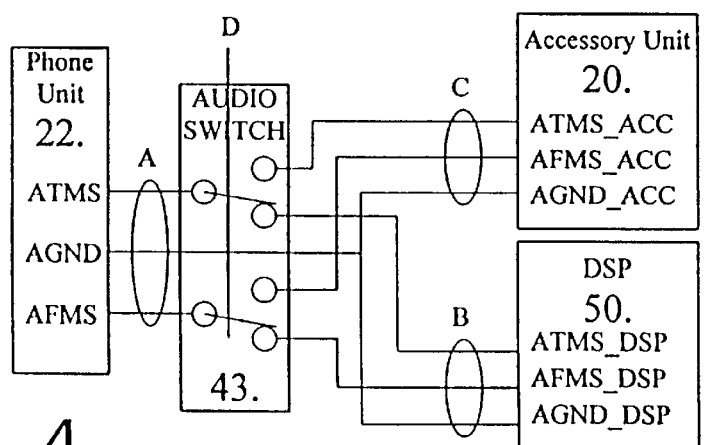
FIG. 4 is a block diagram of an audio switch of the docking and electrical interface of the present invention.

Now referring to FIG. 4, there is shown block diagrams of the circuit connecting the phone unit 22 with either the accessory unit 20 or the audio unit 16, respectively. This connection supports the audio of the personal communication device 10 and is controlled by the micro-controller 44. The micro-controller 44 monitors the logical input signals (FIG. 5) of the accessory unit 20 and the serial channels from the phone unit 22 and the other units and switches signals audio to mobile station ("ATMS") and audio from mobile station ("AFMS") in response thereto. The reference signal audio signal ground ("AGND") is connected to all analog circuits in the docking and electrical interface 1. If the audio switch 43 connects the phone unit 22 with the accessory unit 20, the audio lines are passed through the micro-controller 44 without change. However, if the audio switch 43 connects the phone unit 22 to the audio unit 16, the audio signals are passed through the DSP circuit 50, containing the handsfree algorithm.

Referring again to FIGS. 1 and 2, the power unit 14 connects a master power source 54, such as an automobile battery, and the various units of the docking and electrical interface 1. The power unit 14 filters generator noise and spikes from the power derived from the master power source 54.

Figure 6:
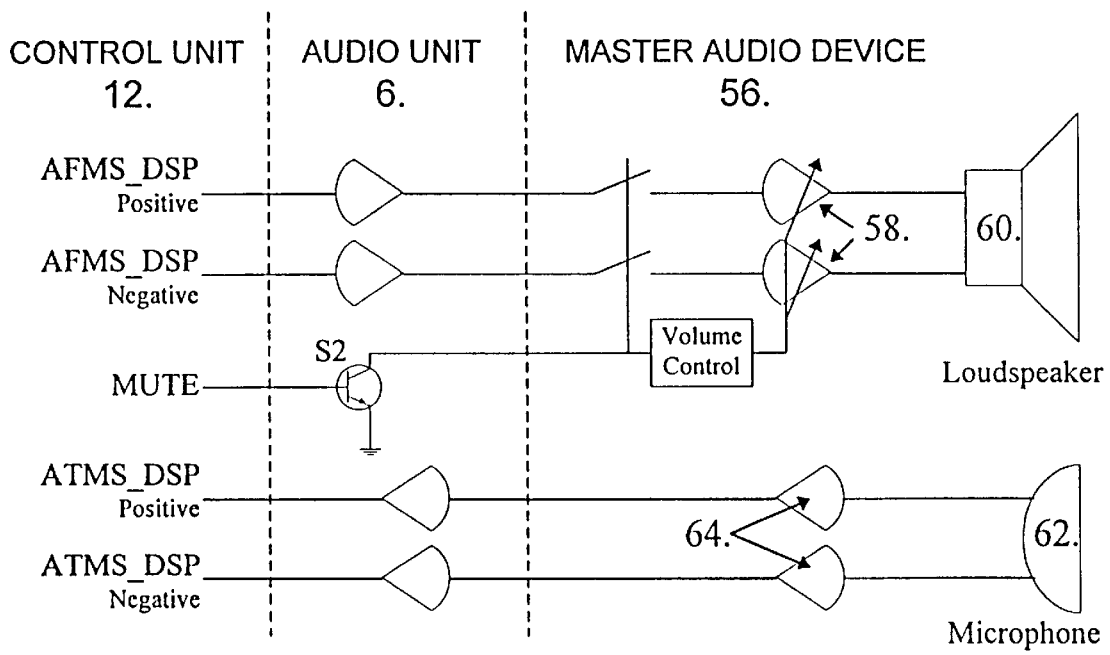
FIG. 6 is a circuit diagram illustrating the interaction of the audio unit and the control unit of the docking and electrical interface of the present invention with the audio device of the master electronic system.

The audio unit 16 of the docking and electrical interface 1 serves as the interface between the docking and electrical interface 1 and the a master audio device 56, such as an audio system, radio, tape player, CD player, etc., of an automobile. Referring now to FIG. 6, there is shown a preferred embodiment of the circuit between the audio unit 16 and the master audio device 56. The audio unit 16 adjusts the AFMS_DSP signal level to correspond with the master audio device 56 so that the personal communication device 10 can use the loudspeakers 60 of the master audio device 56 as its own. The signal is directed through a stereo loudspeaker amplifier 58 before it is sent to the loudspeakers 60 of the master audio device 56. The audio unit 16 also adjusts a microphone signal from a microphone 62 provided by the master electronic system to the DSP audio input signal ATMS_DSP. The microphone 62 is preferably factory installed by the manufacturer of the master electronic system and allows the personal communication device 10 to be used "hands-free". An amplifier 64 for the microphone 62 is preferably located as close to the microphone 62 as possible to minimize S/N ratio and shielded to minimize likelihood of interference from RF frequencies between about 100–3000 MHZ.

Using the preferred circuit (FIG. 6), the master audio device 56 (e.g., radio, CD player, etc.) is automatically muted at switch S2 when the AFMS-DSP is activated to allow the personal communication device 10 to utilize the loudspeakers 60 of the master audio device 56.

Referring to FIG. 1, the master data unit 18 is a voltage level conversion circuitry and functions as a buffer between the displays (e.g., liquid crystal display) and input devices (e.g., keyboards, keypads) of the master controls 66 and the docking and electrical interface 1. For example, if the power unit 14 provides 12 V supply but the control unit 12 requires only 3–5 V supply, the master data unit 18 provides the appropriate conversion circuitry. Alphanumeric keys included in the master controls 66 of the master electronic system (e.g., the buttons for an automobile's stereo system or on the automobile's steering wheel) and required to operate the personal communication device 10 are utilized by the docking and electrical interface 1 via the master data unit 18. When the personal communication device 10 is in use, those keys and buttons operate the functions and features of the personal communication device 10 instead of a function or feature of the master electronic system.

The accessory unit 20 is used to connect the docking and electrical interface 1 with accessories that normally connect directly to the personal communication device 10, such as personal computers and the like.

In a preferred embodiment, the docking and electrical interface 1 is installed in a vehicle, such as an automobile. The docking and electrical interface 1 is conveniently positioned in the dashboard or under the console of the vehicle within easy reach of the operator of the vehicle. The cradle 24 releasibly receives a personal communication device 10. When a personal communication device 10, such as a portable mobile cellular telephone, is placed within the cradle 24, the phone unit 22 closes switch S1 (FIG. 5) and the personal communication device 10 is detected by the control unit 12 of the docking and electrical interface 1.

While docked, the personal communication device 10 is provided with charge for battery 26 via the power unit 14. The power unit 14 receives power from the master power source 54 (e.g., battery) of the automobile and transforms such power, if necessary, before providing it to the personal communication device 10 via the phone unit 22. Additionally, the personal communication device 10 has the benefit of enhanced transmission and reception by using the antenna 38 of the docking and electrical interface 1 while docked.

To utilize the personal communication device 10 (e.g., to place a telephone call) while it is docked in the docking and electrical interface 1, the operator uses the master controls 66 of the automobile (e.g., buttons on radio, controls on steering wheel, on-board computer, etc.) via master data unit 18 to activate the personal communication device 10. The operator can either activate the "hands free" option of the personal communications device 10 or initiate the telephone call using the standard controls of the automobiles and picking up the personal communication device 10 from the cradle to conduct the conversation. To utilize the "hands-free" option, the operator merely initiates the personal communication device 10 (e.g., dials the telephone) without removing the personal communication device from the cradle 24 of the docking and electrical interface 1.

Even where the personal communication device 10 is removed from the cradle 24 to conduct a conversation, the operator has the option of initiating the personal communication device 10 (e.g., dialing the telephone) without having to pick up and manipulate the relatively small buttons and keypad of the personal communication device 10, thus allowing the operator to keep his or her attention focused on operation of the vehicle versus operation of the personal communication device 10.

The loudspeakers 60 of the master audio device 56 (i.e., automobile stereo) are used by the personal communication device 10 so that the operator hears dialing tones, conversation, etc. over the loudspeakers 60 of the vehicle. Switch S2 acts as a mute switch and enables the audio amplifier in the master audio device 56 to be used by the audio unit 16.

Preferably, the entire telephone call is conducted using the hands-free option, thus allowing the operator of the vehicle to keep his or her attention firmly focused on the operation of the vehicle. Additionally, the appropriately-sized keys and controls of the vehicle's master electronics allow the operator to easily and safely operate the personal communication device 10 and do not present additional limitations on the physical size of the personal communication device 10.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A docking and electrical interface for interfacing a personal communication device with a master electronic system, having master controls, said docking and electrical interface comprising:

a cradle to selectively support said personal communication device in a docked position; and means for electrically interconnecting said personal communication device with said master electronic system such that the master controls of the master electronics system selectively control the personal communication device.

2. The interface of claim 1, wherein the master electronic system further includes a power source and the personal communication device further includes a battery, said interface further including means for electrically interconnecting the power source of the master electronic system to the personal communication device and providing a charge to the battery of the personal communication device.

3. The interface of claim 1, wherein the master electronic system further includes an antenna, said interface further including means for electrically interconnecting the antenna of the master electronic system with the personal communication device and providing the personal communication device with wireless reception and transmission of data.

4. The interface of claim 1, wherein the master electronic system further includes a microphone, said interface further including means for electrically interconnecting the microphone of the master electronic system with the personal communication device for providing the personal communication device with hands-free transmission of data.

5. The interface of claim 1, wherein the master electronic system further includes an audio device, said interface further including means for electrically interconnecting the audio device of the master electronic system with the personal communication device for providing the personal communication device with hands-free monitoring of data received by the personal communication device.

6. The interface of claim 1, wherein the personal communication device is a cellular telephone.

7. The interface of claim 1, wherein the master controls are separate from the cradle.

8. The interface of claim 1, wherein the master electronic system further includes a power source, an antenna, a microphone and an audio device and the personal communication device further includes a battery, said interface further including means for electrically interconnecting said personal communication device with the master electronic system, means for electronically interconnecting the power source to the personal communication device, means for electronically interconnecting the antenna with the personal communication device, means for electronically interconnecting the microphone with the personal communication device, and means for electronically interconnecting the audio device with the personal communication device.

9. The interface of claim 8, wherein the means for electrically interconnecting said personal communication device with said master electronic system is connected to and controlled by a control unit.

10. The interface of claim 1, wherein the master electronic system is a vehicle.

11. The interface of claim 10, wherein the vehicle is an automobile.

12. The interface of claim 1, wherein the master controls selectively control a functionality of a second device in response to a predetermined condition.

13. The interface of claim 12, wherein the predetermined condition comprises deactivation of the docking and electrical interface.

14. A docking and electrical interface for interfacing a personal communication device, having a battery, with a master electronic system, having an antenna, a microphone, a user interface for controlling functionalities of the master electronic system, a power source and an audio device, said docking and electrical interface comprising:

means to selectively support said personal communication device in a docked position;

means for electrically interconnecting said personal communication device with said master electronic system such that the user interface of the master electronics system selectively controls a functionality of the personal communication device, the user interface of the master electronics system being separate from the means to selectively support;

means for electronically interconnecting the power source of the master electronic system to the personal communication device and providing a charge to the battery of the personal communication device;

means for electrically interconnecting the antenna of the master electronic system with the personal communication device for providing the personal communication device with wireless reception and transmission of data;

means for electrically interconnecting the microphone of the master electronic system with the personal communication device for providing the personal communication device with hands-free transmission of voice; and means for electrically interconnecting the audio device of the master electronic system with the personal communication device for providing the personal communication device with hands-free monitoring of data received by the personal communication device.

15. The interface of claim 14, wherein the user interface of the master electronic system selectively controls a functionality of a second device in response to a predetermined condition.

16. The interface of claim 15, wherein the predetermined condition comprises deactivation of the docking and electrical interface.

17. The interface of claim 14, wherein the means for electrically interconnecting said personal communication device with said master electronic system, the means for electrically interconnecting the power source, the means for electrically interconnecting the antenna, the means for electrically interconnecting the microphone and the means for electrically interconnecting the audio device are connected to and controlled by a control unit.

18. The interface of claim 17, wherein the control unit includes digital circuitry and analog circuitry.

19. The interface of claim 17, wherein the personal communication device is a cellular telephone.

20. The interface of claim 17, wherein the master electronic system is a vehicle.

21. The interface of claim 20, wherein the vehicle is an automobile.

22. A docking and electrical interface for interfacing a personal communication device, having a battery, with a master electronic system, having an antenna, a microphone, a user interface for selectively controlling functionalities of the master electronic system, a power source, at least one accessory and an audio device, said docking and electrical interface comprising:

a cradle to selectively support said personal communication device in a docked position;

a phone unit electrically interconnecting the personal communication device and the master electronic system;

a power unit electrically interconnecting the power source of the master electronic system and the battery of the personal communication device, said power unit providing a charge to the battery of the personal communication device;

an audio unit electrically interconnecting the audio device of the master electronic system and the personal communication device, said audio unit providing the personal communication device with hands-free monitoring of data received by the personal communication device;

a master data unit selectively electrically interconnecting the user interface of the master electronic system and the personal communication device such that the user interface of the master electronic system selectively controls functionalities of the personal communication device instead of functionalities of the master electronic system;

an accessory unit electrically interconnecting the at least one accessory of the master electronic system with personal communication device for providing accessory features for the personal communication device; and a control unit electrically interconnecting said phone unit, said power unit, said audio unit, said master data unit and said accessory unit of the docking and electrical interface, said control unit monitoring and controlling the functions of said units.

23. The interface of claim 22, further including means for electrically interfacing the antenna of the master electronic system and the personal communication device to provide the personal communication device with wireless reception and transmission of data.

24. The interface of claim 22, wherein the at least one accessory is a microcomputer capable of receiving, processing and storing data.

25. The interface of claim 22, wherein the personal communication device is a cellular telephone.

26. The interface of claim 22, wherein the master electronic system is a vehicle.

27. The interface of claim 22, wherein the user interface of the master electronic system selectively controls a functionality of the master electronic system upon deactivation of the docking and electrical interface.

* * * * *